Patented Nov. 8, 1938

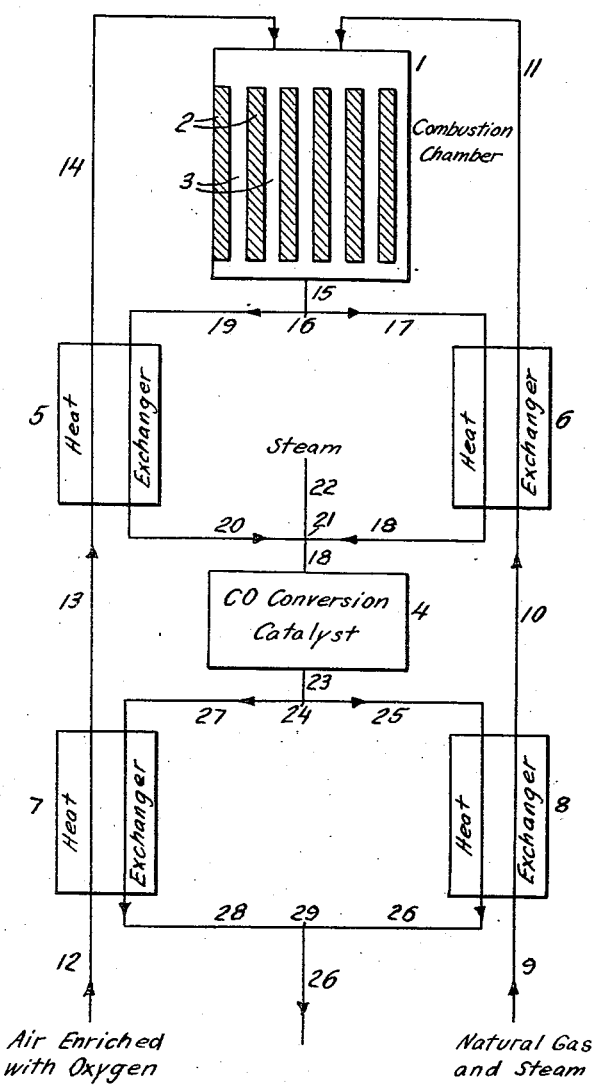

2,135,694

UNITED STATES PATENT OFFICE 2,135,694

PROCESS FOR THE PRODUCTION OF HYDROGEN

Dwight C. Bardwell and Frank Porter, Syracuse, N. Y., assignors, by mesne assignments, to The Solvay Process Company, New York, N. Y., a corporation of New York Application September 25, 1930, Serial No. 484,269
Renewed July 10, 1934

1 Claim. (Cl. 23—7)

This invention relates to a process for the production of hydrogen by the reaction of a hydrocarbon and water vapor. More particularly, this invention relates to a process for the treatment of a hydrocarbon gas, such as natural gas, with water vapor to produce hydrogen.

It has heretofore been proposed to pass a hydrocarbon gas in contact with heated refractory material. When steam is admixed with the gas thus treated, the hydrocarbon and steam react to form carbon monoxide and hydrogen. This reaction is endothermic and, accordingly, a relatively large amount of heat must be supplied to the reacting gases in order to maintain them at the desired high reaction temperatures. Temperatures which have been proposed heretofore for carrying out this reaction have been in the neighborhood of 1100 to 1300° C. It has been proposed to supply the requisite heat by first burning a combustible fuel to heat the refractory material and then after interrupting this heating stage, introducing the hydrocarbon gas and steam into the heated refractory material. When the temperature of the material had fallen to a point at which the hydrocarbon no longer satisfactorily reacted with the water vapor, the gas-making step was interrupted and the refractory material again heated to the desired temperature.

It has also been proposed to produce hydrogen by reaction of hydrocarbon with steam or water vapor by passing the mixture through a pipe externally heated to a high temperature. While such a process lends itself to continuous operation, the high temperatures required for the transfer of the large amounts of heat required through the tube walls makes the process commercially unsatisfactory.

It is an object of this process to provide a continuous process for the production of hydrogen by the reaction of a hydrocarbon gas and water vapor in contact with refractory material at temperatures materially above 1300° C.; i. e. at temperatures above 1360° C. and preferably at a temperature of about 1500° C. at which the decomposition of the hydrocarbon is substantially complete to form hydrogen and carbon monoxide. It is another object of this invention to provide a continuously operable process whereby high temperature heat required for the reaction is supplied by combustion of a portion of the hydrocarbon by means of oxygen.

It is another object of this invention to provide for the removal of sensible heat from the products of the reaction to reduce these products to a temperature at which the carbon monoxide may be catalytically reacted with steam to form hydrogen and carbon monoxide, and to transfer the sensible heat from the reaction products of this catalytic conversion of the carbon monoxide, together with the heat removed from the hydrocarbon decomposition products, to another portion of hydrocarbon gas and steam on its way to reaction at a high temperature in contact with refractory material, whereby the desired high reaction temperature may be continuously maintained without requiring any additional external supply of heat. It is a further object of this invention to provide an efficient continuously operable process for the production of a gas comprising nitrogen and hydrogen, preferably in the proportions of one volume of nitrogen to every three volumes of hydrogen which, after removal of impurities, is satisfactory for catalytic treatment to produce ammonia therefrom. Other objects of the invention will in part be obvious and will in part appear hereinafter.

We have discovered that a hydrocarbon gas, such as natural gas or coal gas, when admixed with steam and contacted with a substantially non-catalytic refractory material at a temperature materially about 1300° C., such as 1360° C. or higher, and preferably at a temperature of about 1500° C., reacts with the steam to form carbon monoxide and hydrogen and that at this high temperature the resulting gaseous product contains substantially no undecomposed hydrocarbon. We have further discovered that by conducting the reaction between hydrocarbon and steam at a high temperature, cooling the resulting gaseous product, reacting the carbon monoxide content thereof with steam in the presence of a catalyst, and transferring the sensible heat from the gases from the high temperature reaction of the hydrocarbon and steam and from the catalytic reaction of the carbon monoxide and steam to other portions of hydrocarbon gas, steam and oxygen-containing gas which are subsequently reacted together that the heat absorbed by the decomposition of the hydrocarbon may be supplied, and the requisite high temperature for substantially complete decomposition of the hydrocarbon be attained by partial combustion of the preheated hydrocarbon gas with the preheated oxygen gas. The oxygen gas may be air enriched with oxygen and, we have further discovered, that by employing sufficient air to form a product containing one part of nitrogen to every three parts of hydrogen and carbon monoxide taken together with added oxygen in an amount sufficient to maintain by combustion of the hydrocarbon gas the desired high temperature of the reaction, a gas which, after removal of the impurities, is suitable for use in the synthetic production of ammonia may be simply and economically manufactured in a continuously operable process.

In carrying out this invention, the hydrocarbon gas, for example natural gas admixed with a desired quantity of steam, is preheated and introduced into a chamber containing highly heated refractory material. At the same time an oxygen-containing gas, such as air enriched with oxygen, is separately preheated and then introduced into the same chamber containing refractory material where the oxygen burns a part of the hydrocarbon to form carbon monoxide and hydrogen and the remainder of the hydrocarbon at the high temperatures attained by combustion of the preheated gas, reacts with the steam to likewise form carbon monoxide and hydrogen.

In the preferred embodiment of this invention, the hot gaseous products are withdrawn from the chamber and sensible heat removed and transferred to other portions of the hydrocarbon gas and steam and oxygen-containing gas on their way to the reaction chamber. If desired for the subsequent treatment described below of the gas from the reaction chamber for conversion of the carbon monoxide, additional steam may be introduced into the gases. After being thus cooled to a temperature suitable for the reaction in contact with a catalyst between the carbon monoxide and steam, the gases are passed into a vessel containing a carbon monoxide conversion catalyst where steam and carbon monoxide react to form carbon dioxide and hydrogen. The gases leaving this catalyst vessel still at an elevated temperature are cooled by extracting sensible heat therefrom and this heat transferred to the hydrocarbon gas and steam mixture and to the oxygen-containing gas on its way to the reaction chamber. The cooled gas is then passed to a gas holder or may be treated in any desired manner for removal of the carbon dioxide and other impurities. By thus separately highly preheating the hydrocarbon gas and steam mixture and the oxygen-containing gas first by heat removed from the gases leaving the carbon monoxide conversion catalyst and then from the gases leaving the high temperature decomposition chamber, and supplementing this preheat by burning a portion of the hydrocarbon gas by means of oxygen in the reaction chamber, the required high temperature of about 1500° C. for a substantially complete decomposition of the hydrocarbon may be attained and maintained.

The invention accordingly comprises the several steps and the relation of one or more of such steps with respect to each of the others thereof which will be exemplified in the process hereinafter described and the scope of the invention will be indicated in the claim.

For a fuller understanding of the nature and objects of this invention, reference should be had to the following detailed description taken in conjunction with the accompanying drawing in which is illustrated a process for the production of a nitrogen-hydrogen gas by the reaction of natural gas and water vapor together with oxygen enriched air.

In the drawing, 1 indicates a reaction chamber which contains a packing 2 of refractory material arranged to permit of the passage of gas therethrough by way of passages 3. Instead of employing this type of packing, however, any other desired arrangement of packing in chamber 1 may be employed. For example, it may be partially filled with irregular pieces of refractory material in such a manner that a gas may pass through the chamber through the interstices between the pieces. A vessel 4 contains a carbon monoxide conversion catalyst, which is preferably a catalyst such as is described in U. S. application, Serial No. 463,462 filed June 24, 1930 by Frank Porter which acts not only to catalyze the reaction between carbon monoxide and steam, but likewise promotes the reaction between the steam and any residual methane contained in the gas leaving chamber 1. Numerals 5, 6, 7 and 8 indicate heat exchangers, preferably of the shell and tube type for the transfer of heat between bodies of gases.

In carrying out the process of this invention employing the apparatus shown in the drawing, a mixture of natural gas and steam from a pipe 9 is introduced and passed through heat exchanger 8 and is passed through a pipe 10, heat exchanger 6 and a pipe 11 to reaction chamber 1. Air enriched with oxygen, preferably in the proportions of about 4.2 volumes of air to every one volume of oxygen, is passed from a pipe 12 through heat exchanger 7, pipe 13, heat exchanger 5 and pipe 14 into reaction chamber 1. As hereinafter described, the natural gas and steam mixture is preheated in heat exchangers 6 and 8 to a temperature preferably of about 1000° C. and the air enriched with oxygen is likewise preheated in heat exchangers 5 and 7, preferably to the same temperature. The thus preheated gases mix in reaction chamber 1 in contact with the refractory material 2, and the combustion of a part of the natural gas by means of the oxygen results in an elevation of temperature to a point at which the remaining unburned hydrocarbon content of the natural gas is substantially completely decomposed by means of the steam to form carbon monoxide and hydrogen. We have found that by thus preheating the reaction gases to about 1000° C., the desired high temperature conditions in reaction chamber 1 may be continuously maintained by introducing into the chamber about 3,5 volumes of natural gas admixed with 4.2 volumes of air enriched with one volume of oxygen.

The hot products of the reaction at a temperature of about 1500° C. leave reaction chamber 1 through a pipe 15 and are divided at 16 into two separate portions, one of which passes through pipe 17, heat exchanger 6 and pipe 18, and the other portion passes through pipe 19, heat exchanger 5 and pipe 20 and again enters pipe 18 at 21. In heat exchangers 5 and 6 these separate portions of the gas from reaction chamber 1 give up a part of their sensible heat to the gases from pipe 13 and 10 respectively, and serve to preheat them, preferably to about 1000° C. The temperature of the gases leaving the heat exchangers should be adjusted to have a temperature appropriate for the catalytic conversion of the carbon monoxide with steam, either by appropriate control of the heat interchange with the gases passing to chamber 1 or in any other desired manner, and are passed into catalyst chamber 4 where carbon monoxide and steam are converted into carbon dioxide and hydrogen by contact with the catalyst contained therein. If the gases from reaction chamber 1 contain insufficient steam for the conversion of the carbon monoxide in vessel 4, additional steam or water which, in contact with the hot gases is converted into steam, may be introduced through a pipe 22. The gases still at an elevated temperature are withdrawn from catalyst vessel 4 through a pipe 23 and divide at 24 into two separate portions, one of which passes through a pipe 25, heat exchanger 8 and a pipe 26, and the other of which passes through a pipe 27, heat exchanger 7 and a pipe 28 and is introduced into pipe 26 at 29. In heat exchangers 7 and 8, sensible heat in the gases from pipes 27 and 25 respectively is transferred to the oxygen enriched air and to the natural gas and steam mixture passing through these heat exchangers. The reaction between the carbon monoxide and steam which takes place in catalyst vessel 4 is an exothermic reaction, so that the gases leaving this vessel contain more sensible heat than is contained in the gases entering the vessel. By thus transferring heat from the products of the carbon monoxide conversion reaction to the natural gas-steam mixture and to the air enriched with oxygen, these gases may be heated to a temperature such that the heat available in the gases leaving reaction chamber 1 is adequate to elevate their temperature to about 1000° C. and thus maintain, together with the heat liberated by the combustion of a part of the hydrocarbon content of the natural gas, the desired high temperature of about 1500° C. in chamber 1.

The gas from pipe 26 which now contains nitrogen, hydrogen and carbon dioxide, together with minor proportions of impurities, such as unconverted carbon monoxide, may be treated in any desired manner for removal of the carbon dioxide and impurities. By employing the above noted proportions of air and oxygen, the gaseous product leaving reaction vessel 1 will contain about one volume of nitrogen to every three volumes of hydrogen and carbon monoxide taken together. The reaction between carbon monoxide and steam results in the production of one volume of hydrogen for every one volume of carbon monoxide. Accordingly, after treatment of the above gas from reaction chamber 1 in catalyst vessel 4, the resulting gas product will contain about one volume of nitrogen for every three volumes of hydrogen and, after removal of the carbon monoxide and impurities, is suitable for the catalytic treatment for the synthesis of ammonia therefrom.

Since certain changes in carrying out the above process which embody the invention may be made without departing from its scope, it is intended that all matter contained in the above description or shown in the accompanying drawing shall be interpreted as illustrative and not in a limiting sense. For example, air enriched with a larger proportion of oxygen than is described above or substantially pure oxygen gas may be employed in carrying out this process, in which case, if the resultant hydrogen gas is to be employed in an ammonia synthesis system, the resulting deficiency in nitrogen may be made up by the introduction of additional nitrogen into the gas obtained from such a modification of the process described. If desired, reaction chamber 1 may contain a catalyst which promotes the reaction of the hydrocarbon and steam. It will be apparent to one skilled in the art that by suitable control of the conditions of operation of the above described process, a gas may be prepared which is particularly suitable for catalytic treatment to produce alcohols or acids (for example, methanol or acetic acid), and the appended claims are intended to include within their scope such modifications of the particular process described.

In application Serial No. 141,562, filed May 8, 1937, in the name of Dwight C. Bardwell as a continuation-in-part of this application, there is claimed the process described herein of separately preheating to temperatures above 1800° F. air and a mixture of a hydrocarbon gas and steam and then introducing the preheated gases into a reaction chamber to form a gas containing hydrogen, nitrogen and carbon monoxide.

We claim:

The process of producing a nitrogen-hydrogen gas, which comprises continuously subjecting a mixture of natural gas and steam to a temperature of about 1500° C. in contact with refractory material, removing sensible heat from the products of said reaction, passing the thus cooled products in contact with a catalyst active to promote the decomposition of the carbon monoxide content of the product by means of steam contained therein, and during the aforesaid steps maintaining the said reaction temperature of 1500° C. by transferring sensible heat from the gaseous product of decomposition of the carbon monoxide with steam to said mixture of hydrocarbon and steam and to oxygen enriched air, transferring sensible heat from the aforesaid products of the reaction between hydrocarbon and steam to said natural gas-steam mixture and said oxygen enriched air to preheat them to a temperature of about 1000° C., mixing the thus preheated gases and regulating the amount of the oxygen enriched air mixed with the natural gas-steam mixture to supply sufficient heat by the combustion of a portion of the natural gas with the oxygen to heat the mixture of gases to a temperature of about 1500° C.

DWIGHT C. BARDWELL.
FRANK PORTER.